(12) United States Patent
Zhang et al.

(10) Patent No.: US 9,966,831 B2
(45) Date of Patent: May 8, 2018

(54) CONTROLLER AND CONTROLLING METHOD OF SWITCHING POWER SUPPLY

(71) Applicant: Silergy Semiconductor Technology (Hangzhou) Ltd., Hangzhou (CN)

(72) Inventors: Dan Zhang, Hangzhou (CN); Zhiliang Hu, Hangzhou (CN); Qiukai Huang, Hangzhou (CN); Yongjiang Bai, Hangzhou (CN); Le Li, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 65 days.

(21) Appl. No.: 14/953,793

(22) Filed: Nov. 30, 2015

(65) Prior Publication Data

US 2016/0156259 A1 Jun. 2, 2016

(30) Foreign Application Priority Data

Nov. 28, 2014 (CN) .......................... 2014 1 0712656

(51) Int. Cl.
*H02J 3/12* (2006.01)
*G05F 1/00* (2006.01)
(Continued)

(52) U.S. Cl.
CPC .......... *H02M 1/08* (2013.01); *H02M 3/33523* (2013.01)

(58) Field of Classification Search
CPC ... H02M 1/143; H02M 1/157; H02M 1/33515
(Continued)

(56) References Cited

U.S. PATENT DOCUMENTS

| 2011/0110126 A1* | 5/2011 | Morrish | H02M 1/44 363/21.18 |
| 2012/0194162 A1* | 8/2012 | Lin | H02M 1/14 323/304 |

(Continued)

FOREIGN PATENT DOCUMENTS

| CN | 102437727 A | 5/2012 |
| CN | 102594118 A | 7/2012 |

*Primary Examiner* — Gary Nash
(74) *Attorney, Agent, or Firm* — Westman, Champlin & Koehler, P.A.

(57) ABSTRACT

The present disclosure relates to a controller and a controlling method of a switching power supply. The controller of the switching power supply is used for turning on and off a power transistor so that inductor current flows through an inductor which is connected in series with the power transistor. The controller includes a frequency-jittering signal generating circuit, a superimpose circuit and a first comparator. The frequency-jittering signal generating circuit generates a frequency-jittering signal variable over time. The superimpose circuit superimposes the frequency-jittering signal on a sampling signal of the inductor current to generate a superimposed signal. The first comparator compares the superimposed signal with a control voltage to generate an OFF signal for turning off the power transistor. The controller of the switching power supply reduces conducted electromagnetic interference by a frequency-jittering control on the sampling signal of the inductor current.

22 Claims, 5 Drawing Sheets (51) Int. Cl.
   *H02M 1/12*    (2006.01)
   *H02M 1/14*    (2006.01)
   *H02M 7/757*   (2006.01)
   *H02M 1/08*    (2006.01)
   *H02M 3/335*   (2006.01)

(58) Field of Classification Search
   USPC ..... 323/242, 243, 246, 286, 287; 363/21.12, 363/21.13, 21.16, 21.18, 39–46, 78, 79, 363/97
   See application file for complete search history.

(56) References Cited

U.S. PATENT DOCUMENTS

2013/0051089 A1* 2/2013 Pan .................. H02M 1/44
                                                 363/21.17
   2013/0100715 A1* 4/2013 Lin .................. H02M 3/33507
                                                 363/21.17

* cited by examiner

CONTROLLER AND CONTROLLING METHOD OF SWITCHING POWER SUPPLY

CLAIM OF PRIORITY

This application claims priority to Chinese Application No. 201410712656.6, filed on Nov. 28, 2014 (published as CN 104333216 A), which is hereby incorporated by reference.

BACKGROUND OF THE DISCLOSURE

Field of the Disclosure

The present disclosure relates to a switching power supply, and more particularly, to a controller and a controlling method of a switching power supply which reduces EMI (Electromagnetic Interference).

Description of the Related Art

A switching power supply is usually an EMI source due to fast switching of power transistors in operation. It is a common concern in industry to reduce EMI as required by some standards of the power supply. A conventional approach to reduce EMI of the switching power supply is to add an EMI filter into the circuit, which, however, increases cost and size of the power supply, deteriorates high-frequency performance, and increases power consumption.

The frequency jittering control is an effective method for suppressing conducted EMI, and has been widely used in some low-power switching power supplies. The method changes an operating frequency of the switching power supply periodically or non-periodically in a range, so that harmonic interference energy is dispersed and the EMI standards are met.

However, the conventional frequency jittering control in the switching power supply is based on the principle of changing a system switching frequency of the switching power supply. Although it can suppress conducted EMI, the power transistor will not be turned on at idea moment due to variation of the system switching frequency. The frequency jittering control leads to higher conduction loss, and lower system efficiency and higher heat dissipation. Moreover, because the power transistor is turned on and off at a high voltage, additional electromagnetic radiation may occur, which results in degradation of EMI.

Thus, it is desirable to further improve the frequency jittering control in a switching power supply to reduce conduction loss and suppress electromagnetic radiation of the power transistor.

BRIEF DESCRIPTION OF THE DISCLOSURE

In view of this, the present disclosure provides a controller and a controlling method of a switching power supply. The controller of the switching power supply utilizes an improved frequency-jittering control to suppress conducted EMI.

According to one aspect of the present disclosure, there is provided a controller of a switching power supply for turning on and off a power transistor so that inductor current flows through an inductor which is connected in series with the power transistor, comprising: a frequency jittering signal generating circuit configured to generate a frequency-jittering signal variable over time; a superimpose circuit configured to superimpose the frequency-jittering signal on a sampling signal of said inductor current to generate a superimposed signal; and a first comparator configured to compare the superimposed signal with a control voltage to generate an OFF signal for turning off the power transistor.

Preferably, the controller further comprises an ON signal generating circuit configured to generate an ON signal; an RS flip-flop configured to receive the ON signal at a set terminal and the OFF signal at a reset terminal, and generate a switching control signal at an output terminal; and a driving circuit configured to generate a driving signal for the power transistor in accordance with the switching control signal.

Preferably, the RS flip-flop is set to "1" when the ON signal changes from a low level to a high level, and is set to "0" when the OFF signal changes from a low level to a high level.

Preferably, the ON signal generating circuit is a timing circuit.

Preferably, the ON signal generating circuit comprises: a second comparator configured to compare a voltage feedback signal representing an output voltage of the controller of the switching power supply with a reference signal to generate a zero-crossing reference signal; and a delay circuit configured to generate a valid ON signal when a predetermined time period has elapsed after the voltage feedback signal crosses zero.

Preferably, the predetermined time period is a time period from the time when the voltage feedback signal crosses zero to the time when the voltage feedback signal decreases and reaches a minimum value.

Preferably, the frequency-jittering signal is one of a triangular wave and a sinusoidal wave.

Preferably, the superimpose circuit changes an initial value of the superimposed signal in accordance with the frequency-jittering signal over time, which initial value is a value when the power transistor is turned on after being turned off.

Preferably, the superimpose circuit changes a slope of the superimposed signal in accordance with the frequency-jittering signal over time, which slope is a rate of change of the superimposed signal when the power transistor is turned on.

Preferably, the frequency-jittering signal generating circuit comprises: a first current source and a first switch which are connected in series between the output terminal and ground; a second current source and a second switch which are connected in series between the output terminal and ground; and a capacitor which is connected between the output terminal and ground, wherein the first current source and the second current source provide currents flowing in opposite directions, and the first switch and the second switch are turned on alternatively.

Preferably, the first current source and the second current source are both voltage-controlled current sources, and the frequency-jittering signal generating circuit further comprises: a third comparator configured to compare the control voltage and the reference voltage to generate the switching control signal; a third switch configured to be turned on and off in accordance with the switching control signal, wherein the third switch provides the control voltage to control terminals of the first current source and the second current source to change current values of the first current source and the second current source when the third switch is turned on.

Preferably, the controller further comprises a voltage feedback circuit configured to adjust the voltage feedback signal to obtain the control voltage which represents an output voltage of the switching power supply.

Preferably, the frequency-jittering signal generating circuit does not output a frequency-jittering signal when the control voltage is smaller than the reference voltage.

Preferably, the frequency-jittering signal generating circuit outputs the frequency-jittering signal having a maximum value in a range of 10 percent and 20 percent of a maximum value of the sampling signal of the inductor current when the control voltage is larger than the reference voltage.

Preferably, the superimpose circuit is a voltage-controlled gain amplifier circuit.

Preferably, the superimpose circuit comprises a first input terminal for receiving the sampling signal of the inductor current, a second input terminal for receiving the frequency-jittering signal and an output terminal for providing the superimposed signal.

Preferably, the superimpose circuit further comprises: a transistor and a plurality of divider resistors, which are connected in series between a supply voltage and ground; a selection circuit configured to connect one of nodes between adjacent ones of the divider resistors with the output terminal; and a comparator configured to compare the sampling signal of the inductor current with the reference voltage to control current flowing through the transistor, wherein the reference voltage is a voltage at one of the nodes between adjacent ones of the divider resistors, and the plurality of divider resistors have different resistance values.

Preferably, the resistance values of the plurality of divider resistors gradually increases or decreases from a power supply terminal to ground.

According to another aspect of the present disclosure, there is provided a controlling method of the switching power supply for turning on and off a power transistor so that an inductor being connected in series with the power transistor generates an inductor current, comprising: generating a frequency-jittering signal variable over time; superimposing a sampling signal of the inductor current on the frequency-jittering signal to generate a superimposed signal; and comparing the superimposed signal with a control voltage to generate an OFF signal for turning off the power transistor.

Preferably, the method further comprises: generating an ON signal; generating a switching control signal in accordance with the ON signal and the OFF signal; and generating a driving signal for the power transistor in accordance with the switching control signal.

Preferably, the step of generating the ON signal comprises: generating the ON signal by a timing circuit.

Preferably, the step of generating the ON signal comprises: comparing a voltage feedback signal corresponding to a voltage across the power transistor with a reference signal to generate a zero-crossing reference signal; and generating a valid ON signal when a predetermined time period has elapsed after the voltage feedback signal crosses zero.

Preferably, the step of generating the OFF signal for turning off the power transistor comprises: changing an initial value of the superimposed signal in accordance with the frequency-jittering signal over time, which initial value is a value when the power transistor is turned on after being turned off.

Preferably, the step of generating the OFF signal for turning off the power transistor comprises: changing a slope of the superimposed signal in accordance with the frequency-jittering signal over time, which slope is a rate of change of the superimposed signal when the power transistor is turned on.

The controller according to the present disclosure uses a frequency-jittering signal generating circuit and a superimpose circuit to adjust an initial value or a slope of the sampling signal of the inductor current. The conduction time of the power transistor varies over time, and the switching cycle $T_S$ of the power transistor also varies over time. The controller of the switching power supply performs frequency jittering to suppress EMI.

In a preferable embodiment, the delay circuit generates a valid ON signal when a predetermined time period has elapsed after the voltage feedback signal crosses zero. The delay circuit maintains a constant delay time to control the moment when the power transistor is turned off, so that the power transistor will be turned on exactly or approximately at a valley bottom. Thus, the conduction loss of the power transistor decreases.

In another preferable embodiment, the voltage feedback circuit adjusts a voltage feedback signal to obtain a control voltage. The control voltage represents an output voltage of the switching power supply. The controller performs no frequency jittering at a low load, but performs frequency jittering at a heavy load, with a frequency-jittering signal having a maximum value proportional to the output voltage of the switching power supply. In the preferable embodiment, the controller solves the problems of having large ripple, high power supply noise and poor stability at the low load, while performing frequency jittering when the EMI noise increases at the heavy load so as to disperse the noise spectrum to meet the EMI standards.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, examples of which are illustrated in the accompanying drawings. It will be understood that the disclosure is not limited to these examples. On the contrary, the disclosure is intended to cover alternatives, modifications and equivalents that may be included within the spirit and scope of the disclosure as defined by the appended claims.

Furthermore, in the following detailed description of the present disclosure, numerous specific details are set forth in order to provide a thorough understanding of the present disclosure. However, it will be readily apparent to one skilled in the art that the present disclosure may be practiced without these specific details.

Figure 1:
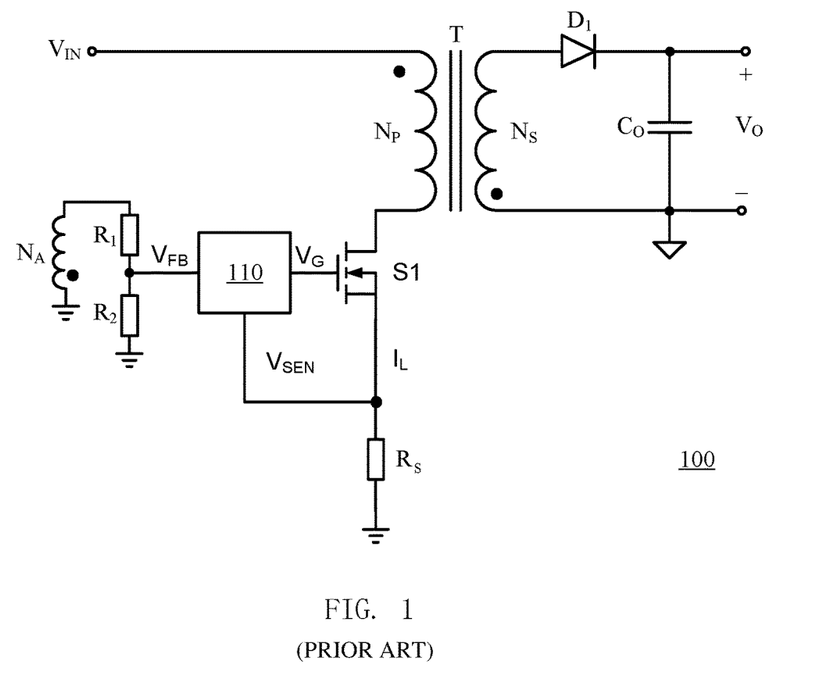
FIG. 1 is a block diagram of flyback topology of a switching power supply.

FIG. 1 is a block diagram of flyback topology of a switching power supply 100. The switching power supply 100 has a flyback topology. The switching power supply 100 includes a transformer T. The transformer T including a primary winding NP, a secondary winding NS and an auxiliary winding NA is configured to transfer power energy and to feedback a signal. A first terminal of the primary winding NP, a second terminal of the secondary winding NS and a second terminal of the auxiliary winding NA of the transformer T are dotted terminals, and a second terminal of the primary winding NP, a first terminal of the secondary winding NS and a first terminal of the auxiliary winding NA of the transformer T are dotted terminals.

At the primary side, an external AC voltage is rectified and filtered to provide an input voltage VIN at the first terminal of the primary winding NP of the transformer T. A power transistor S1 and a sampling resistor RS are connected in series between the second terminal of the primary winding NP of the transformer T and ground.

At the secondary side, the secondary winding NS of the transformer T has a first terminal connected in series with an anode of the diode D1, and has a second terminal being grounded. A capacitor Co is connected in parallel between a cathode of the diode D1 and ground, for providing an output voltage $V_o$ across the capacitor Co. The auxiliary winding NA of the transformer T has a first terminal being used as a feedback terminal, and has a second terminal being grounded. Resistors R1 and R2 constitute a voltage division network, for providing a voltage feedback signal $V_{FB}$ representing an output voltage of the secondary side from the first terminal of the auxiliary winding NA.

The voltage feedback circuit 101 obtains the voltage feedback signal $V_{FB}$ from the auxiliary winding NA of the transformer T. The voltage sampling signal gradually decreases when the power transistor is turned off. The voltage feedback signal $V_{FB}$ decreases sharply at the moment when the secondary winding NS completes discharging.

A controller 110 of the switching power supply obtains a sampling signal $V_{SEN}$ of the inductor current of the primary winding NP from a sampling resistor RS, and a voltage feedback signal $V_{FB}$ of the secondary voltage at the secondary winding from a voltage feedback circuit 101. The controller 110 of the switching power supply generates a driving signal $V_G$ of the power transistor in accordance with the sampling signal $V_{SEN}$ of the inductor current and the voltage feedback signal $V_{FB}$, so as to turn on or off the power transistor S1. For example, the driving signal $V_G$ of the power transistor is a Pulse-Width-Modulation (PWM) signal with a duty ratio, and controls the power transistor S1 to switch between an on state and an off state.

A positive voltage Vin is applied to the primary winding NP of the transformer T and an inductor current IL increases linearly from zero after the power transistor S1 is turned on. When the sampling signal $V_{SEN}$ generated with the inductor current IL flowing through the sampling resistor Rs is equal to a control voltage $V_c$, the power transistor S1 is turned off.

The control voltage $V_c$ represents a limit value of the inductor current at the primary side. In an embodiment, the control voltage is a predetermined voltage of a constant voltage source. In another embodiment, the control voltage $V_c$ is a compensation voltage signal of the voltage feedback signal $V_{FB}$ representing an output voltage at the secondary side. The compensation voltage signal is a stable voltage signal.

In an embodiment, an additional voltage feedback circuit is needed for adjusting the voltage feedback signal $V_{FB}$, in order to obtain a stable control signal $V_c$ which precisely represents an output voltage at the secondary side. The voltage feedback circuit may include a sample and hold circuit which makes the control signal $V_c$ to be a constant value after being processed by the sample and hold circuit. For example, the sample and hold circuit is the same one as in Chinese patent application No. 201210047752.4. Alternatively, the sample and hold circuit may be any of other known sample and hold circuits.

After the power transistor is turned off, a freewheeling current flows through the diode D1 at the secondary side, that is, the secondary winding has a negative voltage $V_o$. Meanwhile, the inductor current IL at the primary side decreases linearly. In a continuous conduction mode (CCM), the power transistor S1 will again be turned on before the inductor current IL decreases to zero. In a discontinuous conduction mode (DCM), the power transistor S1 will again be turned on after the inductor current IL crosses zero. The power transistor S1 will again be turned on at a valley bottom of a waveform of its drain-source voltage in quasi-resonant mode. In the quasi-resonant mode, the control voltage $V_c$ determines a conduction time of the power transistor S1 and the freewheeling current duration of the diode D1 at the secondary side. Accordingly, the control voltage $V_c$ determines switching frequency of the power transistor.

Figure 2:
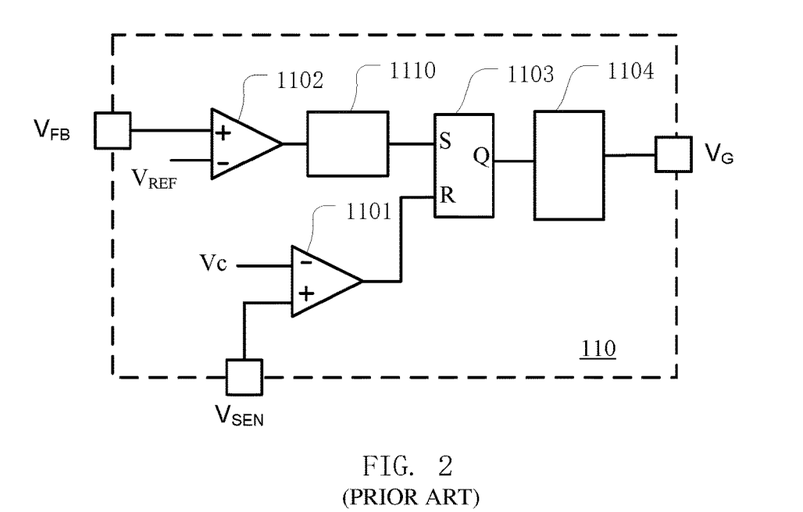
FIG. 2 is a block diagram of an example controller according to the prior art.

FIG. 2 is a block diagram of an example controller 110 according to the prior art. The controller 110 of the switching power supply includes a first comparator 1101, a second comparator 1102, a delay circuit 1110, an RS flip-flop 1103 and a driving circuit 1104.

The first comparator 1101 receives a sampling signal $V_{SEN}$ of the inductor current and a control voltage $V_c$ at non-inverting and inverting input terminals, respectively. An output terminal of the first comparator 1101 provides an OFF signal.

The second comparator 1102 receives a voltage feedback signal $V_{FB}$ and a reference signal $V_{REF}$ at non-inverting and inverting input terminals, respectively. The reference signal $V_{REF}$ is a reference zero voltage. An output terminal of the second comparator 1102 provides a zero-crossing reference signal. The delay circuit 1110 receives the zero-crossing reference signal and generates an ON signal.

The RS flip-flop 1103 receives the ON signal at the set terminal S and an OFF signal at the reset terminal R, and provides a switching control signal at an output terminal Q. The driving circuit 1104 receives the switching control signal at an input terminal, and generates a driving signal $V_G$ of the power transistor at an output terminal.

The driving circuit 1104 provides a driving signal $V_G$ having a high level for turning on the power transistor S1 in a case that the RS flip-flop 1103 provides a signal having a high level at the output terminal Q.

The sampling signal $V_{SEN}$ of the inductor current increases linearly when the power transistor S1 is turned on.

The OFF signal has a high level when the sampling signal $V_{SEN}$ of the inductor current reaches the control voltage $V_c$. The driving circuit 1104 provides a driving signal $V_G$ having a low level for turning off the power transistor S1 when the RS flip-flop 1103 provides a signal having a low level at the output terminal Q.

After the power transistor S1 is turned off, the delay circuit 1110 delays a predetermined time period to generate an ON signal having a high level after the voltage feedback signal $V_{FB}$ crosses zero. The driving circuit 1104 provides a driving signal $V_G$ having a high level for turning on the power transistor S1 again. Then, a next switching cycle continues.

The conventional frequency jittering control is performed by changing an amplitude of the control voltage $V_c$ over time to change a switching frequency.

Figure 3:
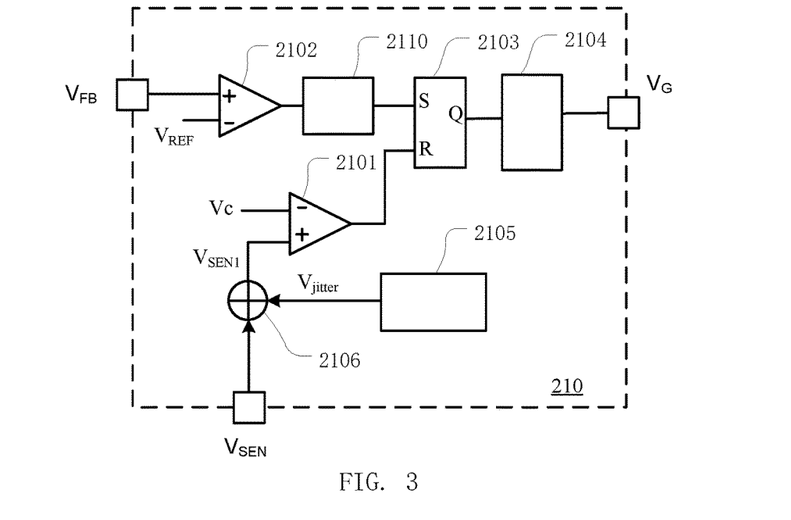
FIG. 3 is a block diagram of an example controller according to an embodiment of the present disclosure.

FIG. 3 is a block diagram of an example controller 210 according to an embodiment of the present disclosure. The controller of the switching power supply 210 includes a first comparator 2101, a second comparator 2102, a delay circuit 2110, an RS flip-flop 2103 and a driving circuit 2104. The controller of the switching power supply 210 according to the embodiment of the present disclosure further includes a frequency-jittering signal generating circuit 2105 and a superimpose circuit 2106, which differs from the conventional controller 210 of the switching power supply.

The frequency-jittering signal generating circuit 2105 generates a frequency-jittering signal $V_{jitter}$. The frequency-jittering signal $V_{jitter}$ may be one of a triangular wave and a sinusoidal wave.

The superimpose circuit 2106 receives the sampling signal $V_{SEN}$ of the inductor current and the frequency jittering signal $V_{jitter}$, and superimposes the frequency-jittering signal $V_{jitter}$ on the sampling signal $V_{SEN}$ of the inductor current to obtain a superimposed signal $V_{SEN1}$.

The controller 210 according to an embodiment of the present disclosure uses the frequency jittering signal generating circuit 2105 and the superimpose circuit 2106 to adjusts an initial value and/or a slope of the sampling signal $V_{SEN}$ of the inductor current, which differs from the conventional frequency-jittering control in which an amplitude of the control voltage $V_c$ is adjusted. The slope is referred to as a slope of the sampling signal $V_{SEN}$ of the inductor current, when the sampling signal $V_{SEN}$ increases linearly.

The first comparator 2101 receives the superimposed signal $V_{SEN1}$ and the control voltage $V_c$ at non-inverting and inverting input terminals, respectively. An output terminal of the first comparator 2101 provides an OFF signal.

The second comparator 2102 receives a voltage feedback signal $V_{FB}$ and a reference signal $V_{REF}$ at non-inverting and inverting input terminals, respectively. The second comparator 2102 provides a zero-crossing reference signal at an output terminal. The delay circuit 2110 receives the zero-crossing reference signal and generates an ON signal.

The RS flip-flop 2103 receives the ON signal at a set terminal S and an OFF signal at a reset terminal R, and provides a switching control signal at the output terminal Q. The driving circuit 2104 receives the switching control signal at an input terminal, and generates a driving signal $V_G$ of the power transistor at an output terminal.

The driving circuit 2104 provides a driving signal $V_G$ having a high level for turning on the power transistor S1 in a case that the RS flip-flop 2103 provides a signal having a high level at the output terminal Q.

The sampling signal $V_{SEN}$ of the inductor current increases linearly from zero when the power transistor S1 is turned on. Correspondingly, the superimposed signal $V_{SEN1}$ begins to increase.

The OFF signal has a high level when the superimposed signal $V_{SEN1}$ reaches $V_c$. The driving circuit 2104 provides a driving signal $V_G$ having a low level for turning off the power transistor S1 in a case that the RS flip-flop 2103 provides a signal having a low level at the output terminal Q.

The delay circuit 2110 delays a predetermined time period to generate an ON signal having a high level after the voltage feedback signal $V_{FB}$ crosses zero. The predetermined time period relates to the zero-crossing reference signal. The driving circuit 2104 provides a driving signal $V_G$ having a high level for turning on again the power transistor S1. Then, a next switching cycle continues.

In the embodiment, there is provided a frequency jittering method in which a switching frequency is changed by varying the conduction time of the power transistor. The frequency-jittering signal is superimposed on the control signal $V_c$ to control the conduction time $T_{charge}$ of the circuit. $T_{discharge}$ will change following $T_{charge}$ in accordance with the equation $V_{charge} * T_{charge} = V_{discharge} * T_{discharge}$, so that the frequency of the circuit is changed.

Further, in the embodiment, the delay circuit 110 turns off the power transistor S1 when a predetermined time period has elapsed after the voltage feedback signal $V_{FB}$ crosses zero. The delay circuit 110 maintains a constant delay time to control the moment when the power transistor is turned off, so that the power transistor S1 will be turned on exactly or approximately at a valley bottom.

Alternatively, a timing circuit is used to generate the ON signal, instead of the first comparator 2102 and the delay circuit 2110. The timing circuit has a time period equal to the switching cycle $T_S$, for generating an ON signal having a high level. The power transistor is turned on at a valley bottom or an approximate valley bottom by setting the switching cycle $T_S$ to be a predetermined value.

Thus, the controller of the switching power supply operates in a quasi-resonant mode. The switching power loss is substantially decreased, comparing with the prior art. The controller of the switching power supply ensures the power transistor to be turned on at valley bottom while performing frequency jittering control, so that the system efficiency is improved and conducted EMI is suppressed.

Figure 4:
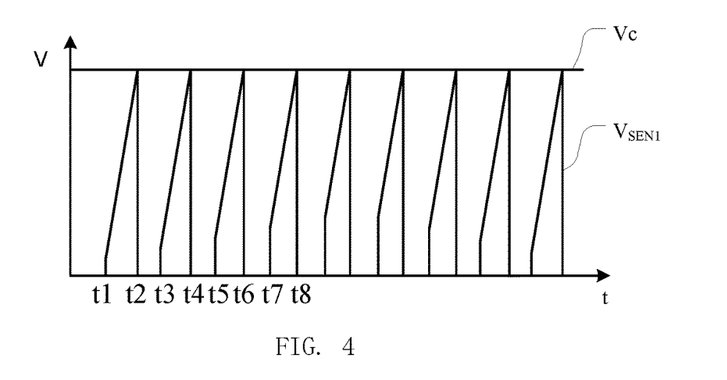
FIG. 4 is a waveform diagram of a first jittering scheme in an example controller according to an embodiment of the present disclosure.

FIG. 4 is a waveform diagram of a first jittering scheme in an example controller according to an embodiment of the present disclosure. The first jittering scheme is not to adjust amplitude of the control voltage $V_c$, but to adjust initial values of the sampling signal $V_{SEN}$ of the inductor current.

In connection with FIG. 4, the following is further description about operating principle of the frequency-jittering signal generating circuit 2105 and the superimpose circuit 2106.

The frequency-jittering signal generating circuit 2105 generates a frequency-jittering signal with triangular wave. The frequency-jittering cycle $T_{jitter}$ of the frequency-jittering signal is larger than the switching cycle $T_S$ of the switching power supply. For example, the frequency-jittering cycle $T_{jitter}$ of the frequency-jittering signal may be n times larger than the switching cycle $T_S$ of the switching power supply, where n is a natural number. The maximum value of the frequency-jittering signal is smaller than the maximum value of the sampling signal $V_{SEN}$ of the inductor current. For example, the maximum value of the frequency-jittering signal is within a range of 10 percent and 20 percent of the sampling signal $V_{SEN}$ of the inductor current.

In the frequency-jittering cycle $T_{jitter}$ of the frequency-jittering signal, the frequency-jittering signal $V_{jitter}$ increases linearly during the time period $0-T_{jitter}/2$, and decreases linearly during the time period $T_{jitter}/2-T_{jitter}$. The frequency-jittering signal $V_{jitter}$ reaches a peak at time $T_{jitter}/2$.

The sampling signal $V_{SEN}$ of the inductor current increases linearly from zero when the power transistor S1 is turned on. Correspondingly, the superimposed signal $V_{SEN1}$ begins to increase from initial values which varies over time, due to adjusting an initial value. Then, the power transistor S1 is turned off and the sampling signal $V_{SEN}$ of the inductor current and the superimposed signal $V_{SEN1}$ drop sharply, when the superimposed signal $V_{SEN1}$ reaches the control voltage $V_c$.

The conduction time of the power transistor S1 is a rising time of the superimposed signal $V_{SEN1}$. As shown in FIG. 4, t2-t1 is the conduction time of the first switching cycle $T_S$, and t4-t3 is the conduction time of the second switching cycle $T_S$ and so on. Accordingly, the conduction time of each switching cycle $T_S$ gradually decreases when the frequency jittering signal $V_{jitter}$ increases linearly. The conduction time of each switching cycle $T_S$ gradually increases when the frequency jittering signal $V_{jitter}$ decreases linearly.

Figure 5:
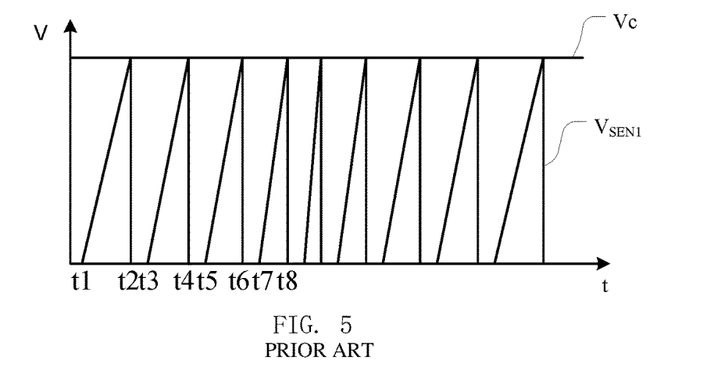
FIG. 5 is a waveform diagram of a second jittering scheme in an example controller according to an embodiment of the present disclosure.

FIG. 5 is a waveform diagram of a second jittering scheme in an example controller according to an embodiment of the present disclosure. The second jittering scheme is not to adjust amplitude of the control voltage $V_c$, but to adjust slopes of the sampling signal $V_{SEN}$ of the inductor current.

In connection with FIG. 5, the following is further description about operating principle of the frequency-jittering signal generating circuit 2105 and the superimpose circuit 2106.

The frequency-jittering signal generating circuit 2105 generates a frequency-jittering signal with triangular wave. The frequency-jittering cycle $T_{jitter}$ of the frequency-jittering signal is larger than the switching cycle $T_S$ of the switching power supply. For example, the frequency-jittering cycle $T_{jitter}$ of the frequency-jittering signal may be n times larger than the switching cycle $T_S$ of the switching power supply, where n is a natural number. The peak values of the frequency-jittering signal are smaller than the peak values of the sampling signal $V_{SEN}$ of the inductor current. For example, the peak values of the frequency-jittering signal are within a range of 10 percent and 20 percent of the sampling signal $V_{SEN}$ of the inductor current.

In the frequency-jittering cycle $T_{jitter}$ of the frequency-jittering signal, the frequency-jittering signal $V_{jitter}$ increases linearly during the time period $0-T_{jitter}/2$, and decreases linearly during the time period $T_{jitter}/2-T_{jitter}$. The frequency-jittering signal $V_{jitter}$ reaches a peak at time $T_{jitter}/2$.

The sampling signal $V_{SEN}$ of the inductor current increases linearly from zero when the power transistor S1 is turned on. Correspondingly, the superimposed signal $V_{SEN1}$ begins to increase from zero in terms of slopes which varies over time, due to the adjusting of slopes. The power transistor S1 is turned off and the sampling signal $V_{SEN}$ of the inductor current and the superimposed signal $V_{SEN1}$ drop sharply, when the superimposed signal $V_{SEN1}$ reaches the control voltage $V_c$.

The conduction time of the power transistor S1 is a rising time of the superimposed signal $V_{SEN1}$. As shown in FIG. 4, t2-t1 is the conduction time of the first switching cycle $T_S$, and t4-t3 is the conduction time of the second switching cycle $T_S$ and so on. Accordingly, the conduction time of each switching cycle $T_S$ gradually decreases when the frequency-jittering signal $V_{jitter}$ increases linearly. The conduction time of each switching cycle $T_S$ gradually increases when the frequency-jittering signal $V_{jitter}$ decreases linearly.

Figure 6:
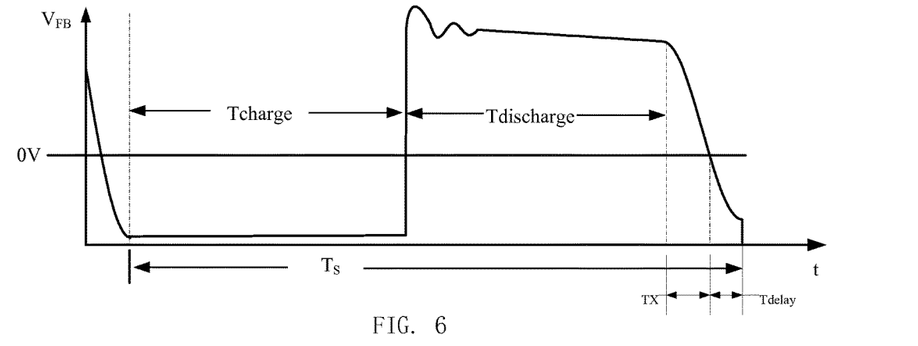
FIG. 6 is a waveform diagram of an example switching power supply according to an embodiment of the present disclosure.

FIG. 6 is a waveform diagram of the switching power supply according to an embodiment of the present disclosure, where the voltage feedback signal $V_{FB}$ varies in one switching cycle $T_S$. The voltage feedback signal $V_{FB}$ corresponds to drain-source voltage of the power transistor S1.

The power transistor S1 is turned on and the current of the primary winding (i.e. the inductor current) increases linearly from zero when a switching cycle $T_S$ begins, that is, the sampling signal $V_{SEN}$ of the inductor current increases linearly. The secondary winding begins to store energy. In the present disclosure, the frequency-jittering signal $V_{jitter}$ is superimposed on the sampling signal $V_{SEN}$ of the inductor current to generate the superimposed signal $V_{SEN1}$. The superimposed signal $V_{SEN1}$ has a triangular wave or a sinusoidal wave, which is shown in FIG. 4 and FIG. 5. The superimposed signal $V_{SEN1}$ is compared with the approximately constant control signal $V_c$. When the superimposed signal $V_{SEN1}$ is equal to the compensation signal, the comparator outputs a signal having a high level for turning off the power transistor S1. The conduction time of the power transistor S1 is $T_{charge}$.

The secondary winding begins to discharge when the power transistor S1 is turned off. Because the leakage inductance of the transformer and parasitic capacitance of the power transistor S1 resonate, the voltage feedback signal $V_{FB}$ has fluctuation as shown in FIG. 6. The secondary winding completes discharging after some time. The secondary winding has discharged for a time period $T_{discharge}$. The voltage feedback signal $V_{FB}$ begins to drop. The voltage feedback signal $V_{FB}$ decreases to the reference zero crossing after a time period Tx. The delay circuit 1110 delays a predetermined time period Tdelay to generate an ON signal having a high level after the second comparator 2102 detects the zero-crossing reference signal. The driving circuit 1104 provides a driving signal $V_G$ having a high level for turning on the power transistor S1. Then, the next switching cycle continues again. The switch-off time of the power transistor S1 is $T_{discharge}$+Tx+Tdelay.

In above process, the sampling signal $V_{SEN}$ of the inductor current and the superimposed signal $V_{SEN1}$ of the frequency-jittering signal $V_{jitter}$ corresponds to the conduction time of the power transistor S1, so that the conduction time of the power transistor S1 is changeable. $T_{discharge}$ changes according to $T_{charge}$ so as to change the switching frequency. That is, it is to suppress EMI by changing the switching frequency.

Figure 7:
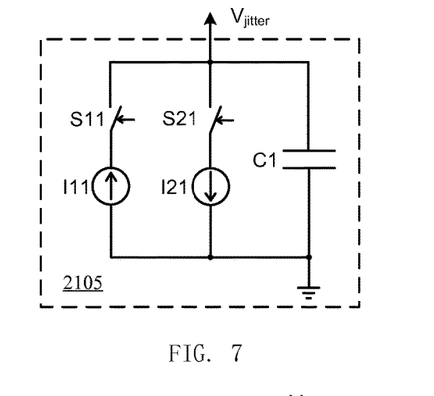
FIG. 7 is a block diagram of an example frequency-jittering signal generating circuit of a controller according to a first embodiment of the present disclosure.

FIG. 7 is a block diagram of an example frequency-jittering signal generating circuit 2105 of a controller according to a first embodiment of the present disclosure.

The frequency-jittering signal generating circuit 2105 includes a first switch S11 and a first current source I11 which are connected in series between the output terminal and ground, a second switch S21 and a second current source I21 which are connected in series between the output terminal and ground, a capacitor C1 connected between the output terminal and ground. In the frequency-jittering signal generating circuit 2105, the first current source I11 and the second current source I21 have opposite current directions.

During the time period $0-T_{jitter}/2$ of the frequency-jittering cycle $T_{jitter}$ of the frequency-jittering signal, the first switch S11 is turned on, the second switch S21 is turned off, the first current source I11 charges the capacitor C1, and the frequency-jittering signal $V_{jitter}$ begins to increase from zero. The frequency-jittering signal $V_{jitter}$ reaches a peak when $t=T_{jitter}/2$. During the time period $T_{jitter}/2-T_{jitter}$, the first switch S11 is turned off, the second switch S21 is turned on, the second current source I21 discharges the capacitor C1, and the frequency-jittering signal $V_{jitter}$ decreases linearly. The voltage across the capacitor C1 just reaches zero when $t=T_{jitter}$, so as to complete a frequency-jittering cycle.

The frequency-jittering cycle continues periodically as above. The frequency-jittering signal generating circuit 2105 generates the frequency-jittering signal $V_{jitter}$ with triangular wave.

In the frequency-jittering signal generating circuit 2105 as shown in FIG. 7, the first switch S11 and the second switch S21 have constant conduction time to generate a frequency-jittering signal with a constant maximum value $V_{jitter\_pk}$. The following will describe further improvements where the frequency-jittering signal generating circuit limits amplitude of the maximum value $V_{jitter\_pk}$ of the frequency-jittering signal.

Figure 8:
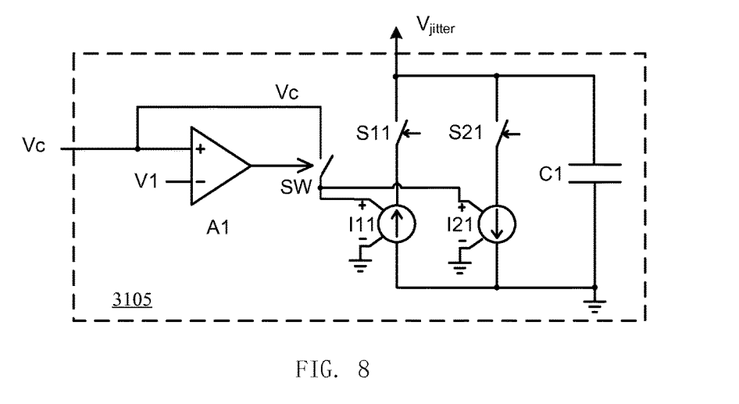
FIG. 8 is a block diagram of an example frequency-jittering signal generating circuit of a controller according to a second embodiment of the present disclosure.

FIG. 8 is a block diagram of an example frequency-jittering signal generating circuit 3105 of a controller according to a second embodiment of the present disclosure.

The frequency-jittering signal generating circuit 3105 includes a first switch S11 and a first current source I11 which are connected in series between the output terminal and ground, a second switch S21 and a second current source I21 which are connected in series between the output terminal and ground, a capacitor C1 connected between the output terminal and ground. In the frequency-jittering signal generating circuit 3105, the first current source I11 and the second current source I21 have opposite current directions. The first current source I11 and the second current source I21 in the frequency-jittering signal generating circuit 3105 according to the second embodiment are voltage-controlled, which differs from that of the first embodiment. The second frequency-jittering signal generating circuit 3105 further includes a comparator A1 and a switch SW.

As mentioned above, the voltage feedback circuit for example obtains an approximately constant control voltage $V_c$ from the voltage feedback signal $V_{FB}$. The control signal $V_c$ corresponds to an output voltage $V_o$ of the switching power supply, that is, a load voltage of the switching power supply.

The comparator A1 respectively receives the control voltage $V_c$ and the reference voltage V1 at non-inverting and inverting input terminal, and compares the control voltage $V_c$ with the reference voltage V1. The comparator A1 provides a switching control signal at the output terminal to turn on and off the switch SW. The switch SW has one terminal connected with the control voltage $V_c$, and the other terminal connected with the control terminals of the first current source I11 and the second current source I21.

During the time period $0-T_{jitter}/2$ of the frequency-jittering cycle $T_{jitter}$ of the frequency-jittering signal, the first switch S11 is turned on, the second switch S21 is turned off, the first current source I11 charges the capacitor C1, and the frequency-jittering signal $V_{jitter}$ begins to increase from zero. The frequency-jittering signal $V_{jitter}$ reaches a peak when $t=T_{jitter}/2$. During the time period $T_{jitter}/2-T_{jitter}$, the first switch S1 is turned off, the second switch S21 is turned on, the second current source I21 discharges the capacitor C1, and the frequency-jittering signal $V_{jitter}$ decreases linearly. The voltage across the capacitor C1 just reaches zero when $t=T_{jitter}$, so as to complete a frequency-jittering cycle.

The frequency-jittering cycle continues periodically as above. The frequency-jittering signal generating circuit 3105 generates the frequency-jittering signal $V_{jitter}$ with triangular wave.

The maximum value $V_{jitter\_pk}$ of the frequency-jittering signal is proportional to the control voltage $V_c$ in the frequency-jittering signal generating circuit 3105. The switch SW is turned off, and no frequency-jittering voltage is added when $V_c<V1$, that is, output power is relative low (i.e. low load). The switch SW is turned on, and frequency-jittering voltage is added when $V_c>V1$. The switch SW connects the control voltage $V_c$ with the control terminals of the first current source I11 and the second current source I21. The control voltage $V_c$ gradually increases when the load becomes higher. The output currents of the first current source I11 and the second current source I21 are proportional to the control voltage of the control terminal, that is, $I=k*V_c$. So the peak values $V_{jitter\_pk}$ of the frequency-jittering signal gradually becomes larger, when the output power becomes larger. As mentioned above, the preferable maximum value of the frequency-jittering signal is within 10% and 20% of the sampling signal $V_{SEN}$ of the inductor current.

In the second embodiment, amplitude of the frequency-jittering signal is changeable and controlled. The value of the control voltage $V_c$ indicates the value of the output power in the circuit. The maximum value $V_{jitter\_pk}$ of the frequency-jittering signal is proportional to the control voltage $V_c$, and the maximum value of the control voltage $V_c$ determines the maximum value of the frequency-jittering signal. Since the maximum value $V_{jitter\_pk}$ of the frequency-jittering signal relates to the control voltage $V_c$, the frequency-jittering signal generating circuit 3105 according to the second embodiment solves the problems of high ripple at low load, power supply noise and poor stability, meanwhile the frequency-jittering control is added to the circuit for dispersing EMI noise spectrum while the EMI noise is relatively high, in order to meet the EMI standards.

The prior frequency jitter is not to control and to limit amplitude of the frequency-jittering signal. The EMI noise at low load is smaller than that at high load. If a frequency-jittering signal with same amplitude is added, it causes high ripple at low load, power supply noise, poor stability and so on.

Figure 9:
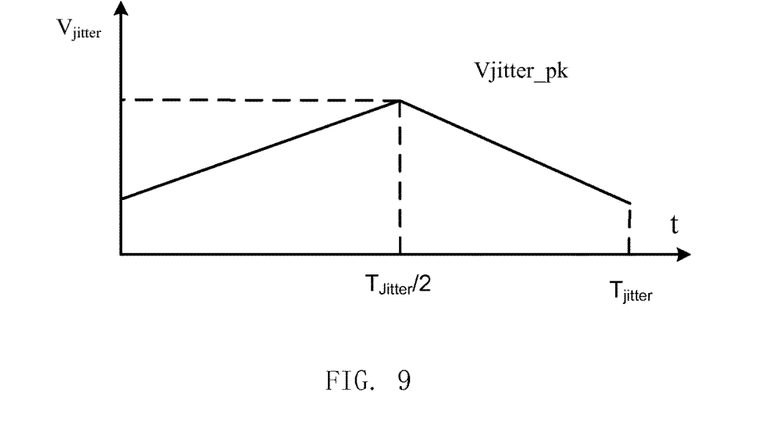
FIG. 9 is a waveform diagram of the frequency jittering signal generating circuit shown in FIGS. 7 and 8.

FIG. 9 is a waveform diagram of the frequency-jittering signal generating circuit as shown in FIGS. 7 and 8. The frequency-jittering signal $V_{jitter}$ has triangular wave. In the time period $0-T_{jitter}/2$ of the frequency-jittering cycle $T_{jitter}$, the frequency-jittering signal $V_{jitter}$ begins to increase from zero. The frequency-jittering signal $V_{jitter}$ is equal to a maximum value $V_{jitter\_pk}$ when $t=T_{jitter}/2$. In the time period $T_{jitter}/2-T_{jitter}$, the frequency-jittering signal $V_{jitter}$ decreases linearly. The voltage across the capacitor C1 just decreases to zero when $t=T_{jitter}$. As mentioned above, the frequency-jittering signal in the frequency-jittering signal generating circuit 3105 according to the second embodiment has a maximum value $V_{jitter}$ in proportion to the control voltage $V_c$.

Figure 10:
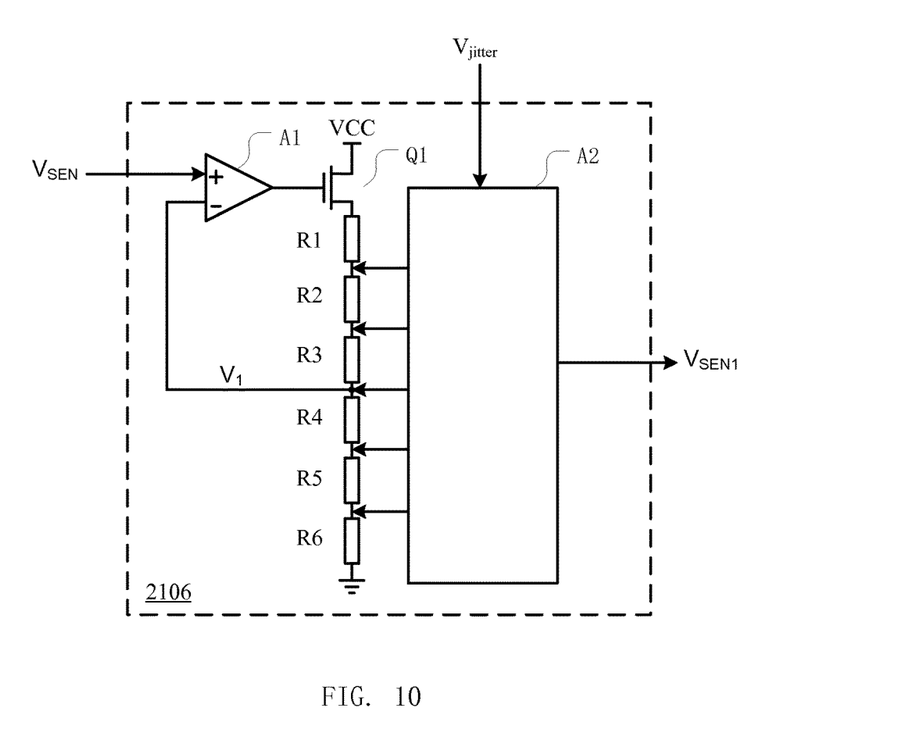
FIG. 10 is a block diagram of an example superimpose circuit of a controller according to an embodiment of the present disclosure.

FIG. 10 is a block diagram of an example superimpose circuit 2106 of a controller according to an embodiment of the present disclosure. In the preferable embodiment, the superimpose circuit 2106 adjusts the slopes of the sampling signal $V_{SEN}$ of the inductor current according to the frequency-jittering signal $V_{jitter}$ to generate a superimposed signal $V_{SEN1}$.

The superimpose circuit 2106 includes an operational amplifier A1, a selector A2, a voltage division network consisting of resistors R1 to R6, and a transistor Q1. The resistors R1 to R6 and the transistor Q1 are connected in series between the supply voltage VcC and ground. A reference voltage V1 is obtained from the nodes between adjacent ones of the resistors R1 to R6.

The operational amplifier A1 receives the sampling signal $V_{SEN}$ of the inductor current at the non-inverting input terminal and the reference voltage V1 at the inverting input terminal, respectively. The output terminal of the operational amplifier A1 is connected with the control terminal of the transistor Q1. The reference voltage V1 is equal to the sampling signal $V_{SEN}$ of the inductor current due to the characteristics "virtual short" of the operational amplifier A1.

The selection circuit A2 includes a first input terminal for receiving the frequency-jittering signal $V_{jitter}$, a plurality of second input terminals being respectively connected with the nodes between adjacent ones of the resistors R1 to R6 and an output terminal for providing a superimposed signal $V_{SEN1}$.

The selection circuit A2 connects one of the plurality of second input terminals with the output terminal, according to the frequency-jittering signal $V_{jitter}$. When the resistors R1 to R6 have different resistance values, the superimposed signal $V_{SEN1}$ have different amplification corresponding to the sampling signal $V_{SEN}$ of the inductor current if selecting different one of the plurality of second input terminals. For example, the superimposed signal $V_{SEN1}$ is equal to $V_{SEN}$*R3/(R4+R5+R6) if the selection circuit A2 has selected the second input terminal between the adjacent resistors R2 and R3. In a preferable embodiment, the resistance values of the resistors R1 to R6 gradually increase and decrease. In another alternative embodiment, it is required that the resistors R1 to R6 have different resistance values.

The sampling signal $V_{SEN}$ of the inductor current increases linearly over time when the power transistor is turned on. The sampling signal $V_{SEN}$ of the inductor current decreases linearly over time when the power transistor is off. The sampling signal $V_{SEN}$ of the inductor current has a slope with a constant value, which mainly depends on the primary winding inductance, the leakage inductance of the primary winding, the sampling resistor Rs of the transformer T in switching power supply and the like.

The superimpose circuit 2106 receives a frequency-jittering signal $V_{jitter}$. The frequency-jittering signal $V_{jitter}$ has for example triangular wave, which increases and decreases linearly periodically, over time. The superimpose circuit 2106 changes amplification of the superimposed signal $V_{SEN1}$ corresponding to the sampling signal $V_{SEN}$ of the inductor current according to the frequency-jittering signal $V_{jitter}$. Finally, the slope of the superimposed signal $V_{SEN1}$ varies over time so as to adjust the slope.

Although the superimpose circuit 2106 according to the embodiment, which is configured to adjust the slope of the sampling signal $V_{SEN}$ of the inductor current, includes a selection circuit A2, the superimpose circuit 2106 in an alternative embodiment may include any known voltage-controlled gain amplifier circuit having a similar function.

Figure 11:
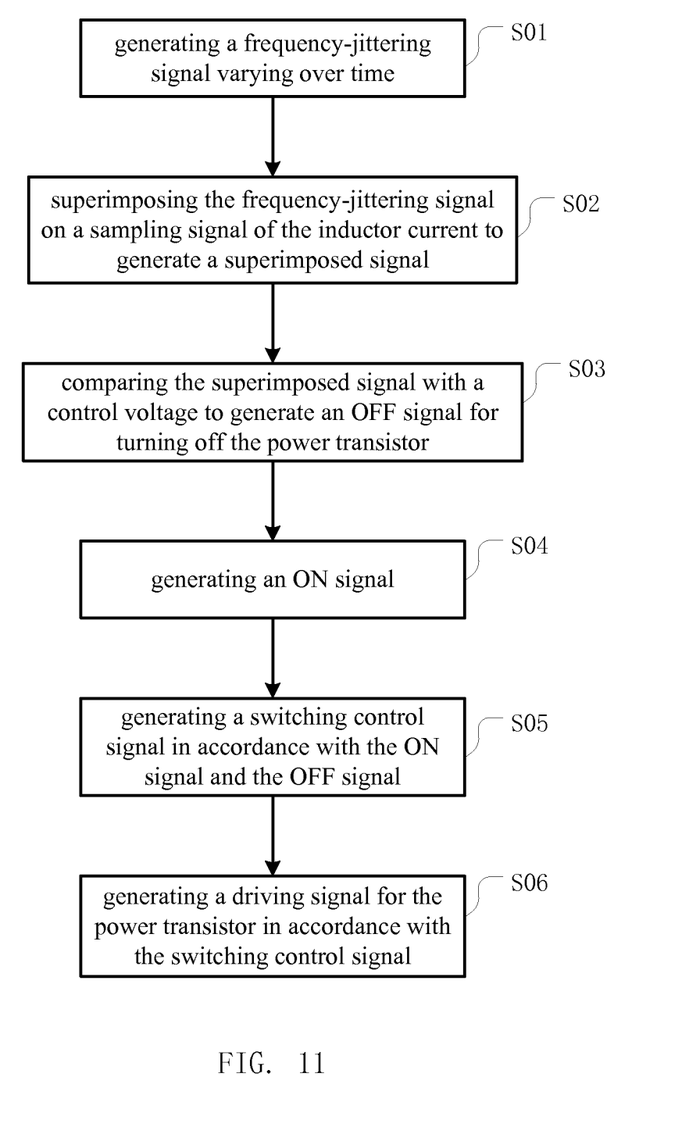
FIG. 11 is a flow chart of an example controlling method according to an embodiment of the present disclosure.

FIG. 11 is a flow chart of an example controlling method according to an embodiment of the present disclosure. The controlling method of the switching power supply is used for turning on and off a power transistor, so that an inductor being connected in series with the power transistor generates an inductor current.

In step S01, a frequency-jittering signal varying over time is generated.

In step S02, the frequency-jittering signal is superimposed on a sampling signal of the inductor current to generate a superimposed signal.

In step S03, the superimposed signal is compared with a control voltage to generate an OFF signal for turning off the power transistor. In one embodiment, the step S03 includes that initial values of the superimposed signal in a time period, during which the power transistor is turned on, are changed over time according to the frequency-jittering signal. In another embodiment, the step S03 includes that slopes of the superimposed signal when the power transistor is turned on are changed over time, according to the frequency-jittering signal.

In step S04, an ON signal is generated. In one embodiment, the step S04 includes that an ON signal is generated by a timing circuit. In another embodiment, the step S04 includes comparing the voltage feedback signal corresponding to the voltage across the power transistor with the reference signal to generate a zero-crossing reference signal, and delaying a predetermined time period to generate a valid ON signal after the voltage feedback signal crosses zero.

In step S05, a switching control signal is generated in accordance with the ON signal and the OFF signal.

In step S06, a driving signal for the power transistor is generated in accordance with the switching control signal.

Although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. The invention is intended to cover alternatives, modifications and equivalents that may be included within the spirit and scope of the invention as defined by the appended claims.

What is claimed is:

1. A controller of a switching power supply having a first output terminal for providing a switching control signal for turning on and off a power transistor so that an inductor current flows through an inductor which is connected in series with said power transistor, comprising:
   a frequency-jittering signal generating circuit configured to generate a frequency-jittering signal variable over time;
   a superimpose circuit configured to superimpose said frequency-jittering signal on a sampling signal of said inductor current to generate a superimposed signal; and
   a first comparator configured to compare said superimposed signal with a control voltage to generate an OFF signal for turning off said power transistor,
   wherein said frequency-jittering signal generating circuit comprises:
      a first current source and a first switch which are connected in series between said first output terminal and ground;
      a second current source and a second switch which are connected in series between said first output terminal and ground; and
      a capacitor which is connected between said first output terminal and ground,
   wherein said first current source and said second current source provide currents flowing in opposite directions, and said first switch and said second switch are turned on alternatively.

2. The controller according to claim 1, further comprising:
an ON signal generating circuit configured to generate an ON signal;
an RS flip-flop configured to receive said ON signal at a set terminal and said OFF signal at a reset terminal, and generate said switching control signal; and
a driving circuit configured to generate a driving signal for said power transistor in accordance with said switching control signal.

3. The controller according to claim 2, wherein said ON signal generating circuit is a timing circuit.

4. The controller according to claim 2, wherein said ON signal generating circuit comprises:
a second comparator configured to compare a voltage feedback signal representing an output voltage of said controller of said switching power supply with a reference signal to generate a zero-crossing reference signal; and
a delay circuit configured to generate a valid ON signal when a predetermined time period has elapsed after said voltage feedback signal crosses zero.

5. The controller according to claim 4, wherein said predetermined time period is a time period from said time when said voltage feedback signal crosses zero to said time when said voltage feedback signal decreases and reaches a minimum value.

6. The controller according to claim 2, wherein said frequency-jittering signal is one of a triangular wave and a sinusoidal wave.

7. The controller according to claim 2, wherein said superimpose circuit changes an initial value of said superimposed signal in accordance with said frequency-jittering signal over time, which initial value is a value when said power transistor is turned on after being turned off.

8. The controller according to claim 2, wherein said superimpose circuit changes a slope of said superimposed signal in accordance with said frequency-jittering signal over time, which slope is a rate of change of said superimposed signal when said power transistor is turned on.

9. The controller according to claim 2, wherein said superimpose circuit is a voltage-controlled gain amplifier circuit.

10. The controller according to claim 9, wherein said superimpose circuit comprises a first input terminal for receiving said sampling signal of said inductor current, a second input terminal for receiving said frequency-jittering signal and a second output terminal for providing said superimposed signal.

11. The controller according to claim 10, wherein said superimpose circuit further comprises:
a transistor and a plurality of divider resistors, which are connected in series between a supply voltage and ground;
a selection circuit configured to connect one of nodes between adjacent ones of said divider resistors with said second output terminal; and
a comparator configured to compare said sampling signal of said inductor current with a reference voltage to control current flowing through said transistor,
wherein said reference voltage is a voltage at one of said nodes between adjacent ones of said divider resistors, and
said plurality of divider resistors have different resistance values.

12. The controller according to claim 11, wherein said resistance values of said plurality of divider resistors gradually increases or decreases from a power supply terminal to ground.

13. The controller according to claim 1, wherein said first current source and said second current source are both voltage-controlled current sources, and said frequency-jittering signal generating circuit further comprises:
a third comparator configured to compare said control voltage and a reference voltage to generate said switching control signal;
a third switch configured to be turned on and off in accordance with said switching control signal,
wherein said third switch provides said control voltage to control terminals of said first current source and said second current source to change current values of said first current source and said second current source when said third switch is turned on.

14. The controller according to claim 13, further comprising a voltage feedback circuit configured to adjust a voltage feedback signal to obtain said control voltage which represents an output voltage of said switching power supply.

15. The controller according to claim 13, wherein said frequency-jittering signal generating circuit does not output said frequency-jittering signal when said control voltage is smaller than said reference voltage.

16. The controller according to claim 13, wherein said frequency-jittering signal generating circuit outputs said frequency-jittering signal having a maximum value in a range of 10 percent and 20 percent of a maximum value of said sampling signal of said inductor current when said control voltage is larger than said reference voltage.

17. A controlling method of a switching power supply having a first output terminal for providing a switching control signal for turning on and off a power transistor so that an inductor being connected in series with said power transistor generates an inductor current, comprising:
generating a frequency-jittering signal variable over time by a frequency-jittering signal generating circuit;
superimposing a sampling signal of said inductor current on said frequency-jittering signal to generate a superimposed signal; and
comparing said superimposed signal with a control voltage to generate an OFF signal for turning off said power transistor,
wherein said frequency-jittering signal generating circuit comprises:
a first current source and a first switch which are connected in series between said first output terminal and ground;
a second current source and a second switch which are connected in series between said first output terminal and ground; and
a capacitor which is connected between said first output terminal and ground,
wherein said first current source and said second current source provide currents flowing in opposite directions, and said first switch and said second switch are turned on alternatively.

18. The controlling method according to claim 17, further comprising:
generating an ON signal;
generating said switching control signal in accordance with said ON signal and said OFF signal; and
generating a driving signal for said power transistor in accordance with said switching control signal.

19. The controlling method according to claim 18, wherein said step of generating said ON signal comprises:
   generating said ON signal by a timing circuit.

20. The controlling method according to claim 18, wherein said step of generating said ON signal comprises:
   comparing a voltage feedback signal corresponding to a voltage across said power transistor with a reference signal to generate a zero-crossing reference signal; and
   generating a valid ON signal when a predetermined time period has elapsed after said voltage feedback signal crosses zero.

21. The controlling method according to claim 18, wherein said step of generating said OFF signal for turning off said power transistor comprises: changing an initial value of said superimposed signal in accordance with said frequency-jittering signal over time, which initial value is a value when said power transistor is turned on after being turned off.

22. The controlling method according to claim 18, wherein said step of generating said OFF signal for turning off said power transistor comprises: changing a slope of said superimposed signal in accordance with said frequency-jittering signal over time, which slope is a rate of change of said superimposed signal when said power transistor is turned on.

\* \* \* \* \*